Patented Sept. 13, 1938

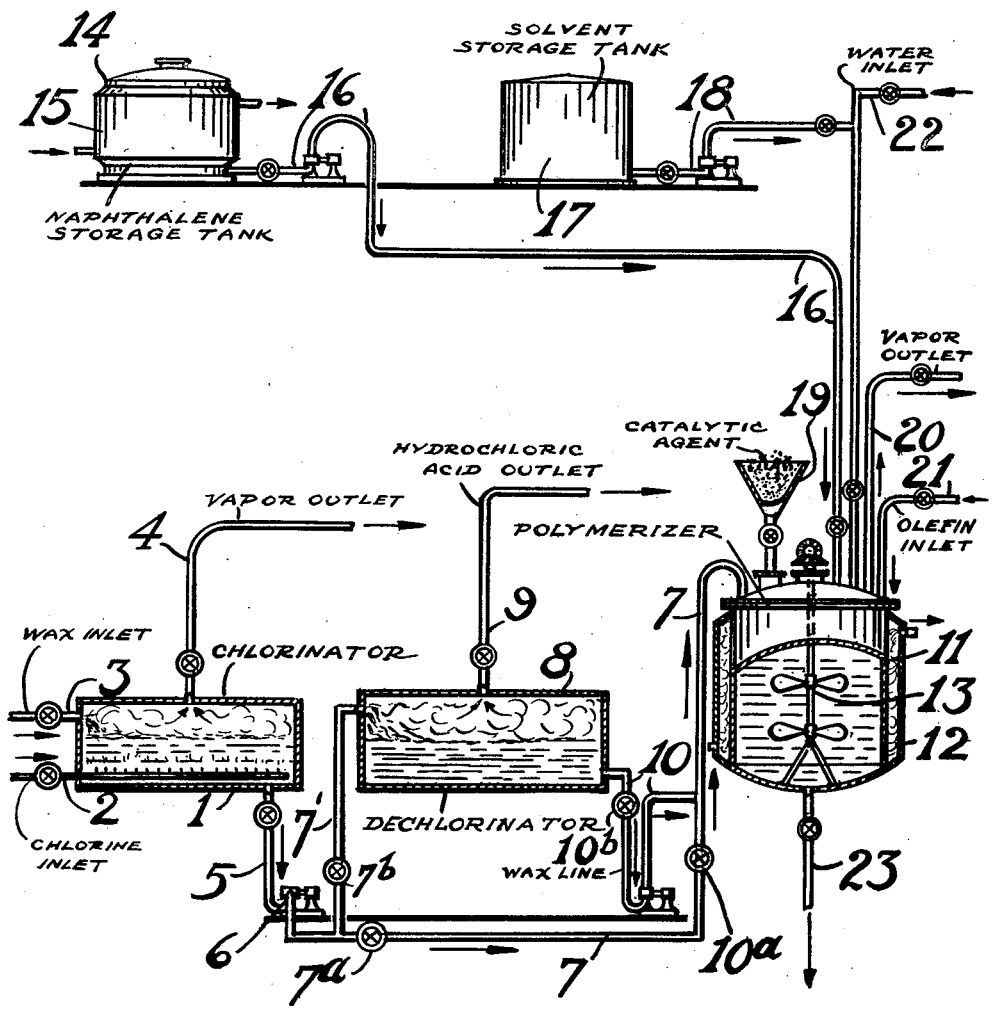

2,130,024

UNITED STATES PATENT OFFICE 2,130,024

PRODUCTION OF LUBRICATING OILS

Mathias Pier, Heidelberg, and Friedrich Christmann, Ludwigshafen-on-the-Rhine, Germany, assignors to Standard-I. G. Company, Linden, N. J., a corporation of Delaware Application September 6, 1930, Serial No. 480,284
Renewed June 16, 1938. In Germany September 30, 1929

25 Claims. (Cl. 196—78)

The present invention relates to improvements in the production of lubricating oils and other valuable products.

The drawing is semi-diagrammatic in form showing a suitable apparatus in which the operation may be carried out including alternative forms.

We have found that good lubricating oils having an average molecular weight up to 500 or even considerably above this, especially products rich in hydrogen containing hydrogen and carbon in a ratio of more than 13.5 parts of hydrogen to each 100 parts of carbon, and other valuable products are obtained, if hydrocarbons of high molecular weight, rich in hydrogen and having no or only slightly lubricating properties, or derivatives of such hydrocarbons are subjected to chemical condensation.

The initial materials to be used according to the present invention should contain at least from 13.5 to 15 parts of hydrogen for each 100 parts of carbon, and they should contain the more hydrogen, the lower their molecular weight. They should have a mean molecular weight of at least 170, and with that mean molecular weight they should contain at least 15 parts of hydrogen for each 100 parts of carbon; when they have a mean molecular weight greater than 250, for example greater than 280, the hydrogen content may be as low as 13.5 parts of hydrogen for each 100 parts of carbon, although in this case also the hydrogen content should preferably be higher.

It results from the foregoing definition that the initial materials used in accordance with the present invention should have a mean molecular weight at least as high as that of middle oils. As examples of the said initial materials may be mentioned saturated or unsaturated, liquid, semi-solid or solid paraffinic hydrocarbons of high molecular weight, for example greater than 250, and rich in hydrogen, which mainly boil above 250° C. and preferably above 300° C., from any origin as for example from natural sources, or prepared by low temperature carbonization of brown coal or shales or by the destructive hydrogenation of coals, tars, mineral oils and the like, or synthetically prepared products as for example those which have been prepared by the reduction of the oxides of carbon with or without the aid of elevated pressure or by the condensation of the constituents of gases from cracking or low temperature carbonization processes or mixtures of the said initial materials. Moreover, hydrocarbons of high molecular weight containing a ring system in their molecule, as for example naphthenic hydrocarbons or substances of high molecular weight prepared by the treatment of hydrocarbons of low molecular weight with high-frequency electric currents, may also serve as the initial materials. Hydrocarbons of high molecular weight, obtained by condensation or polymerization of other hydrocarbons, may also be employed as the initial materials; thus the process may be carried out with the products of high molecular weight obtained by polymerizing unsaturated hydrocarbons, such as olefins, having a low molecular weight. As further initial materials may be mentioned petroleum jelly, ceresine, ozokerite, or montan wax. Use may also be made as initial materials of aliphatic middle oils rich in hydrogen, such as illuminating oils. These may be obtained by distillation from mineral oils and the like or by the destructive hydrogenation of coals, tars, mineral oils and oil shales or by pressure extraction of suitable carbonaceous materials, such as brown coal. Initial materials suitable for use according to the present invention are also obtained by starting from hydrocarbons or derivatives thereof which have a mean molecular weight as hereinbefore defined, but which are too poor in hydrogen, and subjecting these materials to a hydrogenation, preferably under increased pressure and with the aid of catalysts, whereby the hydrogen content is brought within the limit specified. Such previous hydrogenation may also be advantageous in the case of initial materials which correspond to the above definition, but which are still capable of being hydrogenated. Initial materials which contain less hydrogen than indicated above, may also be mixed with initial materials very rich in hydrogen, whereby mixtures are obtained which correspond to the above definition. Initial materials suitable for use according to the present invention may also be obtained from mixtures containing them by treatment with suitable solvents such as liquid sulphur dioxide, phenols and the like, in order to split them up into constituents poor in hydrogen and those rich in hydrogen, the latter being employed according to the present invention, if necessary after they have been rendered still richer in hydrogen by a further hydrogenation, while the constituents poor in hydrogen may be worked up in any suitable manner, as for example subjected to a destructive hydrogenation in order to obtain products richer in hydogen.

It results from the foregoing that the initial materials may either have an open chain structure, or may be of cyclic nature. Preferably, however, initial materials with an open chain structure are employed, because these, as a rule, give the most valuable products due to their particularly high content in hydrogen. As has been pointed out above, the process according to the present invention comprises subjecting the initial materials to chemical condensation. This chemical condensation may be effected with or without splitting off atoms or small radicles or molecules, either by combining hydrocarbons of different character with each other or by combining hydrocarbons of a similar or of the same character, which latter kind of combination or chemical condensation is generally known as polymerization.

For the purpose of effecting the condensation, the initial materials are first exposed to the action of agents capable of introducing exchangeable substituents and are then subjected to the action of chemical condensing agents. By "exchangeable substituents" we wish to include oxygen, sulphur and the halogens, as for example chlorine or bromine. For the introduction of such substituents, the initial materials may be treated, for example, with halogenating agents such as the free halogens or halogen compounds capable of exchanging halogen. The action of the halogen or the halogen-exchanging halogen compounds is preferably effected in the presence of catalysts, such as iodine, antimony trichloride and the like. It is often advisable to carry out this treatment in the presence of inert diluents, as for example carbon tetrachloride. The temperatures used will as a rule range between room temperature and about 100° C. Instead of halogen or halogen-exchanging halogen compounds, for example oxygen may be introduced by passing the initial material with a gas containing oxygen, such as air, at an elevated temperature, for example between about 200° and 400° C., over catalysts such as bauxite or clay sherds. The oxidation may also be effected by passing air through the fused initial material, for example in the presence of aluminium fillers. Sulphur may be introduced into the initial materials by treatment with elementary sulphur or with sulphur compounds, for example sulphuric acid or sulphur trioxide or similar agents having an additive or substituting action. In some cases the process may be carried out so that the halogen, oxygen or the like does not enter the hydrocarbon as a substituent capable of being split off again but acts directly as an agent for withdrawing hydrogen from the molecules of the initial material.

The materials thus treated with agents capable of introducing exchangeable substituents are then subjected to a treatment with chemical condensing agents such as anhydrous inorganic halides having a condensing action, for example aluminium chloride, zinc chloride, iron chloride, boron fluoride, tin chloride, phosphorus oxychloride, antimony chloride, or metals, such as activated aluminium, sodium, alkaline earth metals, zinc dust or alloys containing such metals. The condensation with the aid of said halides may be carried out at ordinary or elevated temperatures, those up to 100° C. usually being employed, and preferably those between 30° and 70° C. In cases where metals are employed as the chemical condensing agent, temperatures of between 100° and 200° C. have been found to be very suitable. Inorganic oxides having an acid reaction, or salts thereof, and in particular oxides capable of forming complex compounds as for example phosphorus pentoxide, molybdenum trioxide, tungstic oxide or chromic oxide are also very suitable condensing agents and these are preferably employed at temperatures between 100 and 200° C. The chemical condensation may be effected at any suitable pressure, but preferably at atmospheric or increased pressures, as for example, 10, 50, 100, 200, 1000 atmospheres or more. The aforesaid chemical condensing agents are particularly valuable when the initial materials have been treated with halogenating agents. When sulphur or oxygen are used as the exchangeable substituents, the chemical condensation is preferably carried out in the presence of phosphorus pentoxide or alkalies or agents having a similar action. These agents are preferably used at temperatures between about 20° and 150° C. The chemical condensation may also be effected by means of fuming sulphuric acid, in which case cooling is necessary. If desired, additions may be made of suspending or emulsifying agents, as for example dilute aqueous solutions of ammonia or aqueous solutions of wetting agents.

During the aforesaid chemical condensation, the exchangeable constituents are, as a rule, split off as such or in the form of their compounds, such as hydrogen halide, water or carbon dioxide, and simultaneously the molecules and radicals of the initial materials formed thereby combine with each other with the formation of lubricating oils or other valuable products. This chemical condensation proceeds in a still more satisfactory way when it is carried out in two stages, in the first of which the exchangeable substituents are split off as such or in the form of their compounds such as halogen hydride, at temperatures below or above the cracking temperature of the products to be treated, the resulting dehydrogenated products being then chemically condensed or polymerized. The said removal of the halogen or halogen compounds may be carried out for example in the presence of alumina, bauxite, aluminium chloride, zinc chloride, barium chloride and the like. Temperatures between 250° and 400° C. are preferably employed for this treatment. The resulting products are then subjected to the action of the aforesaid chemical condensing agents.

It will be seen from the foregoing that during the chemical condensation, hydrogen is sometimes split off from the initial materials, for example in the form of hydrogen halide. In these cases care must be taken that the initial material is correspondingly richer in hydrogen as compared with the foregoing definition of the hydrogen content of the initial materials.

It is preferable to carry out the chemical condensation, whether it be effected in one or in two stages, under so vigorous conditions, for example as regards the temperature or activity of the condensing agent employed, that the exchangeable substituents are completely or practically completely eliminated; thereby particularly useful products are obtained.

It is often advantageous to carry out the chemical condensation in the presence of inert gases, such as nitrogen or carbon dioxide, or of olefines, or diolefines, or mixtures of these, such as ethylene, propylene, butylene, butadiene or isoprene, or gases obtained by cracking. Thus, the said olefines may be passed into the materials undergoing chemical condensation. Particularly valuable products are obtained when carrying out the chemical condensation in the presence of cyclic hydrocarbons, i. e. aromatic or hydroaromatic hydrocarbons, and these may be employed instead of or in addition to the aforesaid olefines.

Suitable cyclic hydrocarbons are especially naphthalene or mineral coal tar fractions such as crude benzol, middle oils, anthracene oils as well as aromatic oils obtained for example by destructive hydrogenation, aromatization, dehydrogenation and the like, or tetrahydronaphthalene, naphthenes, cyclohexane and the like. Also other liquid hydrocarbons such as tars, mineral oils or products obtained therefrom by distillation, extraction or cracking, or products from the destructive hydrogenation of carbonaceous materials, or liquid olefines obtained for example by cracking paraffinic hydrocarbons may be employed for the said purpose.

The nature of the products obtained according to the present invention varies to some extent with the nature of the initial materials employed and with the specific conditions under which the chemical condensation is carried out. Depending on the particular conditions of each case, either valuable lubricating oils or solid products of still higher molecular weight, which are difficultly fusible or infusible, or mixtures of these two types of products are thus obtained. The formation of the said solid products, which are probably in most cases high-molecular hydrocarbons, is favored by carrying out the chemical condensation under very strong conditions of working and also by employing initial materials which are of particularly high molecular weight and which contain appreciable amounts of hydrocarbons which are unsaturated twice or more than twice. Therefore, when it is desired to prepare lubricating oils practically exclusively, it is often desirable to carry out the chemical condensation with an addition of substances which retard the action of the chemical condensing agents. For this purpose use may be made for example of zinc oxide, soda, calcium carbonate or ammonia.

A more reliable control of the reaction for effecting practically exclusively the production of lubricating oils is, however, obtained by carrying out the chemical condensation in a liquid inert diluent. For example, ether, acetone, or completely saturated benzines or kerosenes may be employed as reaction media.

The solid products obtained according to the present invention may be employed for example as insulating materials or in admixture with insulating substances or may be worked up by a suitable mechanical treatment, as for example rolling and kneading, into elastic products similar to rubber, and if desired may be mixed with rubber or rubber-like products.

The lubricating oils obtained according to the present invention, which contain more than 13.5 parts of hydrogen for each 100 parts of carbon, meet almost any requirements of practice when properly selected for the particular use in respect of their viscosity, lubricating power, flash point, behavior in the cold test and other important properties. When products which are too poor in hydrogen are obtained as by-products, these may be further improved by hydrogenation, for example at temperatures between 400° and 450° C. under high pressures of 100, or more suitably 200, 500, 1000 or even more atmospheres and with the aid of strongly hydrogenating catalysts. Or such products may be improved by again subjecting them to the process in accordance with the present invention, and such treatment may also be combined with the aforesaid hydrogenation. Hydrogenation sometimes also still further improves those products which correspond to the hydrogen content hereinbefore specified.

The lubricating oils obtained according to the present invention may often be still further improved by subjecting them to steam distillation in the presence of bleaching earths, such as Florida earth. Similar results are also obtained by adding bleaching earths as chemical condensing agents or to the chemical condensing agents, with which the chemical condensation is carried out.

Many of the lubricating oils obtainable according to the present invention possess valuable properties by which they are distinguished from the lubricants which have been known prior to the present invention. Thus, products may be obtained which have a mean molecular weight above 1000 up to about 2000, a viscosity at 100° C. of from about 10° to about 100° Engler, and a viscosity index (see Dean and Davis, Chemical & Metallurgical Engineering, vol. 36 (1929), page 618) between about 125 and about 140 and often between about 135 and about 140. Other products, in particular those obtainable by carrying out the condensation in the presence of cyclic hydrocarbons such as naphthalene, are characterized by having a mean molecular weight between about 700 and about 1000, a viscosity at 100° C. of from about 8° to about 30° Engler, and a viscosity index between about 115 and about 120.

The valuable lubricating oils obtained according to the present invention are also of very great practical importance for improving less valuable lubricating oils. Thus for example a motor oil of good quality may be prepared by mixing 1 part of a valuable lubricating oil prepared according to the present invention with 2 parts of a commercial machine oil.

Valuable mixtures are obtained by mixing lubricating oils, prepared according to the present invention, which contain more than 13.5 parts of hydrogen to each 100 parts of carbon, with other oils the hydrogen content of which lies below this limit and/or which have an unsatisfactory viscosity-temperature curve. As initial constituents of the latter kinds may be mentioned for example viscous oils, such as are sometimes obtained from mineral oil or tar products or from products of the extraction, destructive hydrogenation or liquefaction of coals, oil shales or the like; furthermore, products, the hydrogen content of which lies below the said limit, which are obtainable from hydrocarbons or hydrocarbon derivatives and which by treatment with halogen and if necessary by subsequent chemical condensation with unsaturated hydrocarbons, either alone or with tar oils or mineral oils, are converted into products of high molecular weight, are also suitable. These viscous oils, the hydrogen content of which is up to 13.5 parts to each 100 parts of carbon, sometimes have the drawback that they have a temperature-viscosity curve which is inferior to that of the commercial lubricating oils. By the appropriate addition of a synthetic lubricating oil, rich in hydrogen, oils may be prepared, the temperature-viscosity curve of which corresponds to that of the usual lubricating oils, although the hydrogen content of these mixed oils may lie below 13.5 parts to each 100 parts of carbon. By an addition of small amounts of this product, the behavior of other oils in the cold test can be considerably improved. In addition to a far-reaching utilization of the crude material the great advantage of the process according to the present invention lies in the fact that cylinder or motor oils may be prepared which are equally as valuable as, and in part even superior to, the Pennsylvanian oils.

In the drawing numeral 1 denotes a chlorinator which may be in the form of a closed vessel provided with a perforated pipe 2 placed along the bottom through which chlorine is introduced in a finely divided condition. The wax to be chlorinated is added by pipe 3 in a molten state. The chlorinator may be controlled in temperature by a suitable jacket, which is not shown but is adapted for heating or cooling, and hydrochloric acid vapors formed during chlorination are led off by a pipe 4. The chlorinated wax is withdrawn from the chlorinator 1 by means of a pipe 5 and a pump 6 which may be used to force the chlorinated wax through a pipe 7 directly to the polymerizer to be described below, or if desired, the wax may be forced by a line 7' into a dechlorinator 8. The dechlorinator is adapted to be heated to an elevated temperature suitable for causing the splitting off of hydrochloric acid which passes overhead by a pipe 9 and is conducted away for recovery or use elsewhere leaving waxy olefins in the vessel 8. This dechlorinated wax is then removed by a pipe 10 and may be forced through pipe 7 into the polymerizer. It will be understood that chlorinated wax may be used directly in the polymerizing vessel 11 and in such case the valves 7b and 10b are closed so that the dechlorinator is not a part of the system. On the other hand, if dechlorinated wax is to be used then the valves 7a and 10a are closed and 7b and 10b are opened so that the chlorinated wax flows into the dechlorinator and the dechlorinated wax passes therefrom to the polymerizer 11.

The polymerizer 11 is a closed agitator preferably fitted with a temperature controlling jacket 12 and an agitating device 13. As indicated before, the chlorinated wax or the dechlorinated wax, as the case may be, enters by the pipe 7. If an aromatic material such as naphthalene is to be used, it is withdrawn from a tank 14, which may be fitted with a suitable heating jacket 15 to maintain the contents in liquid condition if a solid such as naphthalene is used, and flows through a pipe 16 into the polymerizer. If solvent material is to be employed, it is likewise withdrawn from a tank 17 and flows into the polymerizer by a pipe 18. The catalytic agent, such as aluminum chloride, may be introduced into the reaction vessel in regulated quantities by means of a hopper 19 or other suitable device for introducing solids. Hydrochloric acid vapors, split off during the polymerization reaction, are carried away by a pipe 20 and if desired low boiling olefins may be introduced by a pipe 21. Water may be introduced by the line 22 to wash the product of reaction which may be finally withdrawn by the pipe 23.

The entire apparatus should be adapted to withstand the corrosive action of the chlorine and hydrochloric acid gases or at least that portion of the apparatus which is exposed to these materials.

The following examples will further illustrate the nature of this invention, but the invention is not restricted to these examples. The parts are by weight.

*Example 1*

Chlorine is led, while stirring, into brown coal paraffin wax, having a melting point of 52° C., at a temperature of from 100° to 150° C. until the increase in weight amounts to about 12 per cent of the paraffin employed. The chlorination may be promoted by exposure to light or by the presence of a catalyst, as for example iodine. 100 parts of this chlorinated paraffin are chemically condensed at from 30° to 50° C. with 10 parts of naphthalene in the presence of 10 parts of aluminium chloride, and a saturated kerosene as a diluent. After cooling, two layers are obtained. The upper layer contains the kerosene, unchanged paraffin and the condensation product. By distilling off the kerosene, removing the paraffin by freezing out and distilling off the constituents which boil up to 220° C. at a pressure of 15 millimetres mercury gauge, a motor oil having a viscosity of 10° Engler at 50° C., a mean molecular weight of 550 and a hydrogen content of about 15 parts to each 100 parts of carbon is obtained from the upper layer. The yield of motor oil amounts to about 50 parts.

The lower layer contains, in addition to aluminium chloride and unchanged paraffin, a resin oil which may be isolated in the usual manner and may be converted into a good lubricating oil by hydrogenation and if necessary by subsequent chemical condensation as hereinbefore described.

The motor oil may be split up into spindle oil and cylinder oil by careful distillation, and in this manner a hot steam cylinder oil having a specific gravity of 0.909 and a flashpoint of 330° C., and a mean molecular weight of from 800 to 900 may be obtained in an amount of 50 per cent of the motor oil.

Small traces of chlorine which may be present in the product, may be removed by stirring with 2 to 4 per cent of sodium at between 150° and 200° C.

By mixing 30 parts of a cylinder oil having a viscosity of 5° Engler at 100° C. prepared as hereinbefore described with 70 parts of a light machine oil having a viscosity of 4° Engler at 50° C., a good motor oil having a viscosity of 10° Engler at 50° C. is obtained.

*Example 2*

30 parts of a cylinder oil containing 14.3 parts of hydrogen to each 100 parts of carbon prepared according to the present invention are mixed with 70 parts of a light machine oil having a hydrogen content of 12.7 parts to each 100 parts of carbon, prepared by destructive hydrogenation of brown coal low temperature carbonization tar. A motor oil is obtained the temperature-viscosity curve of which corresponds to that of a Pennsylvanian oil and which contains 13.1 parts of hydrogen to each 100 parts of carbon.

*Example 3*

Chlorine is passed into soft paraffin wax having a melting point of about 40° C. until an increase in weight of about 15 per cent is attained, while maintaining a temperature of between about 50° and 60° C. 100 parts of the resulting chlorinated paraffin are chemically condensed at a temperature of between 30° and 60° C. with 10 parts of naphthalene in the presence of 7 parts of aluminium chloride, 5 parts of zinc oxide and 40 parts of a saturated middle oil having a boiling point range of between 200° and 300° C. which latter product acts as diluent.

The reaction product is treated with dilute hydrochloric acid and is then subjected to a steam distillation in vacuo. A residue consisting of a good hot steam cylinder oil having a flash point of 310° C. and a viscosity of 12° Engler at 100° C. is obtained in a yield of about 50 per cent. The distillate is freed from paraffin wax by freezing out and furnishes a further 20 per cent of a light lubricating oil having a viscosity of 3° Engler at 50° C. 25 per cent of unchanged paraffin wax are recovered from the distillate. Both the aforesaid cylinder oil and the light lubricating oil from the distillate may be employed for the production of motor oils by mixing them with the usual commercial machine oils.

Example 4

100 parts of soft paraffin wax chlorinated substantially as described in Example 3 and containing 16 per cent of chlorine are chemically condensed with 10 parts of naphthalene at a temperature of between about 130° and 150° C. in the presence of 6 parts of molybdic anhydride. The reaction product is washed with water and is then subjected to steam distillation in vacuo up to a temperature of about 250° C. A distillation residue consisting of a good motor oil having a viscosity of 2.8° Engler at 100° C. is obtained in a yield of about 60 per cent. The distillate also contains a light lubricating oil in a yield of about 15 per cent besides about 35 per cent of the original paraffin wax. Tungstic acid may be employed as the chemical condensing agent in place of molybdic anhydride in the above example.

Example 5

100 parts of chlorinated paraffin wax containing about 14 per cent of chlorine are subjected at a temperature of about 10° C. to centrifuging or filtration or pressing. In this manner 70 parts of a liquid chlorinated paraffin wax are obtained containing about 20 per cent of chlorine and 30 parts of a solid paraffin wax only containing small amounts of chlorine which wax can be subjected again to the chlorinated process.

100 parts of the said liquid chlorinated paraffin are chemically condensed at a temperature of from 100° to 150° C. with 10 parts of tetrahydronaphthalene in the presence of 10 parts of zinc oxide. The reaction yields 60 parts of a hot steam cylinder oil having a flash point of 310° C., 25 parts of a light spindle oil, whereas most of the chlorine is recovered in the form of hydrogen chloride.

Example 6

100 parts of chlorinated soft paraffin containing about 15 per cent of chlorine are treated at a temperature of about 130° C. with 7 parts of zinc chloride. The reaction yields 45 parts of a motor oil having a viscosity of 11° Engler at 50° C., 5 parts of a spindle oil and 35 parts of unchanged paraffin wax.

Example 7

25 parts of a synthetic cylinder oil obtained as described in Example 1 and having a viscosity of about 7° Engler at 100° C. are mixed with 75 parts of a lubricating oil having a viscosity of 1.7° Engler at 100° C. which have been obtained by the destructive hydrogenation of mineral oil containing large amounts of asphalt. A very good motor oil is obtained having the quality of Pensylvanian oils.

Example 8

100 parts of a chlorinated paraffin wax obtained as described in Example 1 and containing 15 per cent of chlorine are subjected to a distillation in vacuo up to a temperature of about 350° C. Hydrogen chloride is thus split off from the product. The paraffin wax which has thus been dehydrogenated and which contains 15 parts of hydrogen to each 100 parts of carbon is chemically condensed by treatment with 7 parts of anhydrous aluminium chloride and 7 parts of zinc oxide, no heat being introduced. After the removal of unchanged paraffin wax, a condensation product remains in a yield of about 80 per cent which consists of motor oil and which can be separated by careful distillation into two constituents, 40 per cent of spindle oil and 60 per cent of hot steam cylinder oil being thus obtained.

Example 9

A fraction of Columbia oil boiling above 300° C. which for improving its viscosity curve had been subjected to a destructive hydrogenation constitutes a machine oil having a viscosity of 5° Engler at 50° C. and a setting point of 0° C. If this oil is mixed with 10 per cent of a synthetically obtained cylinder oil prepared as described in Example 1 having a viscosity of 6° Engler and a setting point of 0° C., the resulting mixture will have a setting point of 25° below zero C. and a viscosity of 6.5° Engler at 50° C.

Example 10

Chlorine is led at from 60° to 70° C. into a solid paraffin wax obtained by extraction from brown coal until the increase in weight amounts to from about 25 to 30 per cent of the weight of paraffin wax employed. Hydrogen chloride is split off from this chlorinated product by distillation in vacuo up to 360° C. 100 parts of this resulting unsaturated product practically free from chlorine are chemically condensed at from 40° to 60° C. with 7 per cent of aluminium chloride which is added gradually. About 30 per cent of a cylinder oil having a mean molecular weight of about 1500 are obtained and also 70 per cent of a solid, high molecular infusible, insoluble substance consisting of carbon and hydrogen which is separated by extraction with benzine from the lubricating oil formed at the same time, free from aluminium chloride by boiling with alcoholic hydrochloric acid and finally washed with caustic soda and water.

Example 11

Chlorine is led at from 100° to 150° C. into an illuminating oil (specific gravity 0.780) containing 17 parts of hydrogen to each 100 parts of carbon, while stirring, until the increase in weight amounts to about 18 per cent of the weight of the illuminating oil employed. The chlorinated oil is then led at about 350° C. over barium chloride, hydrochloric acid being thus split off.

100 parts of this dehydrogenated oil practically free from halogen are polymerized with 8 parts of aluminium chloride without the supply of heat. The temperature rises to from 80° to 100° C. owing to the heat of reaction. After removing the aluminium chloride 40 per cent of an illuminating oil are obtained and also 60 per cent of a lubricating oil having a viscosity of 17° Engler at 50° C. and the temperature-viscosity curve of a Pennsylvanian lubricating oil.

The resulting lubricating oil may be split up into one third of a spindle oil and two thirds of a cylinder oil having a viscosity of about 5° Engler at 100° C.

Example 12

Hard paraffin wax having a specific gravity of 0.780 at 60° C. is chlorinated until the product has a specific gravity of 0.940 at 60° C. This product which contains about 25 per cent of chlorine, is then subjected to steam distillation in vacuo at temperatures up to 360° C., whereby the chlorine is split off in the form of hydrogen chloride. The resulting dehydrogenated product is subjected to a sweating operation for removing unaltered paraffin, and thereafter has a specific gravity of 0.840 at 20° C.

100 parts of this product are diluted with 100 parts of a saturated benzine obtained by refining in the usual manner, and 7 parts of zinc oxide and 7 parts of aluminium chloride are then gradually added. The chemical condensation is carried out at between 30° and 40° C. After the reaction is complete, the chemical condensing agent is removed by filtration, the diluent (benzine) is distilled off, and the resulting oil is heated to 300° C. and filtered again. The resulting product is composed of 15 per cent of illuminating oil (kerosene), 20 per cent of spindle oil boiling between 220° and 300° C. under about 20 millimetres mercury pressure, and 60 per cent of cylinder oil boiling above 300° C. at the said pressure. The cylinder oil is golden yellow and shows green fluorescence; it has a specific gravity of 0.881 at 20° C., a viscosity of 15° Engler at 99° C. and gives a value of 0.66 in the Conradson carbon test.

By "condensation", as employed in the appended claims, we mean a joining together of two or more molecules, as distinguished from a purely physical condensation from the vapor to the liquid stage, and by "condensing agent" in the appended claims we mean an agency capable of effecting the joining of two or more molecules.

By the term "substantially saturated" appearing in the claims is meant that the product, while not necessarily completely chemically saturated, is substantially stable under the ordinary conditions to which lubricating oils are subjected and does not dry in air to form films or skins. The ultimate composition of the product depends naturally on the materials used in its manufacture; for example, the carbon-hydrogen ratio is higher where aromatic materials are employed than in cases where the product is the result of the condensation of aliphatic materials alone and furthermore, the carbon-hydrogen ratio will also depend on the particular aromatic used and on the ratio of the chloroparaffin to the aromatic.

As a specific example, a product made approximately according to Example 1, in which the chloroparaffin was condensed with naphthalene, the product had a carbon hydrogen weight ratio of 6.97 to 1 and an iodine number of 22.5 grams per 100 grams of the sample. This indicates that the product was largely mono-olefinic and comprised molecules resulting from the union of about three of the original wax molecules to two molecules of naphthalene.

What we claim is:—

1. The process of producing lubricating oils which comprises subjecting a normally solid mixture of aliphatic hydrocarbons to a treatment adapted to convert them, without rupturing their carbon structure, into derivatives of substantially the same number of carbon atoms having an open chain and capable of intercoupling to produce normally liquid substantially saturated lubricating oils, and subjecting such derivatives to a treatment adapted to effect the intercoupling of the said derivatives to form normally liquid substantially saturated lubricating oils in which the chains of the said derivatives are substantially preserved.

2. Process according to claim 1 in which the initial material is paraffin wax and the treated wax is subjected to the action of a catalytic metal halide to effect the intercoupling.

3. The process of producing oils which comprises acting on a mixture of normally solid aliphatic hydrocarbons with an agent capable of introducing an exchangeable substituent into the hydrocarbons without rupturing their carbon chains and at points mainly removed from the ends of said chains and subjecting the thus substituted hydrocarbons to a treatment capable of eliminating the exchangeable substituent and of effecting coupling of two or more of the hydrocarbon chain radicals at points where the exchangeable substituent has been split off, the amount of the exchangeable substituent introduced and the reaction conditions of the said treatment being correlated so as to produce mainly saturated high molecular weight normally liquid lubricating oils in which the carbon chains of the said radicals are substantially preserved.

4. Process according to claim 3 in which the coupling of the substituted hydrocarbons is effected by the action of a catalyst capable of splitting off the exchangeable substituent and simultaneously coupling the hydrocarbon chain radicals.

5. Process as defined in claim 3 in which the initial material is paraffin wax.

6. Process according to claim 3 in which the agent capable of introducing an exchangeable substituent is a halogenating agent and the catalyst is an anhydrous metal halide.

7. Process according to claim 3 in which the hydrocarbon mixture is paraffin wax, the agent capable of introducing the exchangeable substituent is a halogenating agent and the catalyst is an anhydrous metal halide.

8. Process according to claim 3 in which the hydrocarbon mixture is paraffin wax, the agent capable of introducing the exchangeable substituent is free chlorine and the catalyst is anhydrous aluminum chloride.

9. The process of producing lubricating oils which comprises acting on a mixture of normally solid, aliphatic hydrocarbons with an agent capable of introducing an exchangeable substituent into the hydrocarbons under conditions under which exchangeable substituents are introduced at points mainly removed from the ends of said hydrocarbons and under which the carbon structure of the original hydrocarbons is preserved and subjecting the thus substituted hydrocarbons in the presence of a cyclic compound to the action of a catalyst capable of splitting off the exchangeable substituent and simultaneously coupling the hydrocarbon radicals so produced in chains on the said cyclic compound at points in the chains at which the exchangeable substituents have been split off, the amount of exchangeable substituent introduced and the reaction conditions under which said hydrocarbons are subjected to the action of a catalyst being so correlated as to produce high molecular weight substantially saturated lubricating oils liquid at normal temperatures and in which the carbon chains of the substituted hydrocarbons are substantially preserved.

10. The process defined in claim 9 in which the cyclic compound is an aromatic hydrocarbon.

11. The process as defined in claim 9 in which the hydrocarbon mixture is paraffin wax, the agent capable of introducing the exchangeable substituent is a halogenating agent, the catalyst is an anhydrous metal halide and the cyclic compound is an aromatic hydrocarbon.

12. Process according to claim 3 in which the agent capable of introducing the exchangeable substituent is a halogenating agent and the treatment with the catalyst is carried out at a temperature below about 200° C., said temperature being lower the more active the catalyst and being below 100° C. for anhydrous metal halides.

13. Process of producing lubricating oils comprising acting upon paraffin wax with a halogenating agent capable of introducing exchangeable halogen into the hydrocarbon chains at points mainly removed from the ends thereof while preserving their carbon structure, subjecting the halogenated hydrocarbons to the action of an anhydrous metal halide capable of splitting off said halogen and coupling the hydrocarbon radicals so produced at points in the chains where the halogen has been split off, the temperature prevailing during the coupling step being maintained below 100° C. and being so correlated with the activity of the anhydrous halide and the amount of the halogen introduced into the wax as to produce mainly saturated high molecular weight normally liquid lubricating oils in which the carbon chains and the hydrocarbon radicals are substantially preserved.

14. The process according to claim 13 in which the halogenated wax is subjected to the action of an anhydrous metal halide at a temperature below 100° C. in the presence of an aromatic hydrocarbon.

15. Process for producing synthetic lubricating oils which comprises passing chlorine into paraffin wax at a temperature below about 150° C. to introduce not more than 25% chlorine into the wax and at points in the hydrocarbon chain mainly removed from the ends thereof, and subjecting the resulting product to the action of a condensing agent at a temperature below about 200° C., the temperature being lower the more active the condensing agent and the higher the chlorine content of the substituted wax and being below 100° C. for aluminum chloride, to produce thereby mainly saturated normally liquid lubricating oils.

16. Process according to claim 15 in which the condensation of the chlorinated wax is effected in the presence of an aromatic hydrocarbon.

17. The process of producing lubricating oils which comprises chemically combining chlorine with paraffin wax in an amount of the order of 12 to 15% by weight and at points mainly removed from the ends of the hydrocarbon chains and under conditions adapted to avoid rupturing the carbon structure of the wax hydrocarbons, and subjecting the chlorinated wax in conjunction with about 10% by weight of naphthalene to the action of aluminum chloride at a temperature between about 30 and 70° C., whereby mainly saturated lubricating oils liquid at normal temperatures are produced.

18. Process of producing synthetic oils which comprises acting on a mixture of normally solid aliphatic hydrocarbons with an agent capable of introducing an exchangeable substituent into the hydrocarbons without rupturing the carbon chains and at points mainly removed from the ends of said chains, subjecting the thus substituted hydrocarbons to a treatment capable of eliminating the exchangeable substituent and subjecting the product thus obtained to a treatment capable of effecting the intercoupling of two or more chain radicals at the points where the substituent has been split out, the amount of the exchangeable substituent introduced and the reaction conditions of said coupling treatment being correlated so as to produce substantially saturated high molecular weight normally liquid lubricating oils in which the carbon chains of said radicals are substantially preserved.

19. A condensation product comprising a substantially saturated normally liquid hydrocarbon lubricating oil produced by the interaction of condensible derivatives having an open chain which are obtained from a mixture of normally solid aliphatic hydrocarbons, the carbon chains of the originally waxy hydrocarbons being substantially preserved both in the derivatives and in the condensation product thereof and possessing pour depressing properties.

20. A product as defined in claim 19 in which the condensation product includes a cyclic carbon-containing nucleus as a constituent part of its structure.

21. A substantially saturated synthetic lubricating oil comprising a condensation product of mineral wax hydrocarbons rendered condensible without rupturing the carbon skeletons thereof, said condensation product comprising essentially intercoupled hydrocarbon chains having substantially the same carbon skeletons as the original wax hydrocarbons, and being liquid at normal temperature and possessing pour depressing properties.

22. A product as defined in claim 21 in which the condensation product includes a cyclic carbon nucleous as a constituent part of its structure.

23. A condensation product as defined in claim 21 wherein said condensation product contains an aromatic hydrocarbon nucleus as a constituent part of its structure.

24. A condensation product as defined in claim 21 wherein the wax is paraffin wax and the said condensation product includes a naphthalene nucleus as a constituent part of its structure.

25. A substantially saturated synthetic hydrocarbon having a molecular weight of at least 500 and being miscible with lubricating oils, comprising a condensation product of wax hydrocarbons rendered condensible at points intermediate the ends of the hydrocarbon chains without rupturing the carbon skeletons thereof, said condensation product comprising essentially intercoupled hydrocarbon chains having substantially the same carbon skeletons as the original wax hydrocarbons and possessing pour depressing properties.

MATHIAS PIER.
FRIEDRICH CHRISTMANN.